United States Patent
Strutt et al.

(10) Patent No.: US 7,483,413 B2
(45) Date of Patent: Jan. 27, 2009

(54) SYSTEM AND METHOD FOR MANAGING COMMUNICATION LINKS BETWEEN NODES IN A WIRELESS COMMUNICATION NETWORK

(75) Inventors: Guenael Strutt, Stanford, FL (US);
Jeffrey C. Schmidt, Orlando, FL (US);
Philip J. Hill, Oviedo, FL (US); Allen M. Roberson, Altamonte Springs, FL (US); Keith Goldberg, Casselberry, FL (US); Donald L. Joslyn, DeBary, FL (US); Wilfrido R. Gomez, Orlando, FL (US)

(73) Assignee: MeshNetworks, Inc., Maitland, FL (US)

( * ) Notice: Subject to any disclaimer, the term of this patent is extended or adjusted under 35 U.S.C. 154(b) by 478 days.

(21) Appl. No.: 11/314,223

(22) Filed: Dec. 21, 2005

(65) Prior Publication Data

US 2006/0159030 A1    Jul. 20, 2006

Related U.S. Application Data

(60) Provisional application No. 60/640,172, filed on Dec. 30, 2004.

(51) Int. Cl.
*H04Q 7/24*          (2006.01)

(52) U.S. Cl. .................... 370/338; 370/328; 455/441; 455/424

(58) Field of Classification Search ................ 370/338, 370/328; 455/441, 424
See application file for complete search history.

(56) References Cited

U.S. PATENT DOCUMENTS

| 5,729,826 | A | 3/1998 | Gavrilovich |
| 5,896,411 | A | 4/1999 | Ali et al. |
| 6,807,165 | B2 | 10/2004 | Belcea |
| 6,873,839 | B2 | 3/2005 | Stanforth |
| 7,181,214 | B1 * | 2/2007 | White ................ 455/435.1 |
| 2002/0058502 | A1 | 5/2002 | Stanforth |
| 2003/0134658 | A1 | 7/2003 | Kaminski et al. |

\* cited by examiner

*Primary Examiner*—Nghi H Ly
(74) *Attorney, Agent, or Firm*—Randi L. Karpinia; Joseph J. Buczynski

(57) ABSTRACT

A system and method for management of communication links between nodes in a wireless communication network (100). The system and method perform the operations of estimating an expected rate of change in the characteristics pertaining to communication over a communication link in the network (100), and assigning a value associated with the link based on the expected rate of change. The system and method also adjust the rate of change of the value associated with the link based on the condition of the link.

18 Claims, 6 Drawing Sheets

US 7,483,413 B2

SYSTEM AND METHOD FOR MANAGING COMMUNICATION LINKS BETWEEN NODES IN A WIRELESS COMMUNICATION NETWORK

This application claims the benefit of U.S. Provisional Application No. 60/640,172, filed Dec. 30, 2004 the entire content of which being incorporated herein by reference.

CROSS-REFERENCE TO RELATED APPLICATION

Related subject matter is described in a United States Patent Application Publication Number US20060160540A1 by Guenael T. Strutt et al. entitled "System and Method for Determining the Mobility of Nodes in a Wireless Communication Network", published Jul. 20, 2006, filed concurrently herewith, the entire content of which is incorporated herein by reference.

FIELD OF THE INVENTION

The present invention relates to wireless communication networks and, more particularly, to a system and method for managing communication links between nodes in a wireless communication network by estimating the expected change in the quality of the communication links.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in United States Patent Application Publication number US-2002-0058502-A1 entitled "Ad Hoc Peer-to-Peer Mobile Radio Access System Interfaced to the PSTN and Cellular Networks", filed on Jun. 29, 2001, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", granted Oct. 19, 2004, and in U.S. Pat. No. 6,873,839 entitled "Prioritized-Routing for an Ad-Hoc, Peer-to-Peer, Mobile Radio Access System", granted Mar. 29, 2005, the entire content of each being incorporated herein by reference.

As can be appreciated by one skilled in the art, the connectivity between nodes in a wireless network, and the quality of the communication links between the nodes, can change due to the mobility of one or more nodes. For example, if nodes move out of each other's broadcast range, their direct link may fail. Also, if a node moves into an obstructed area, or into a high traffic or noisy area, the quality of the communication links between that node and other nodes can be adversely affected by this new environment and as a result the quality of the communication links can decrease. An example of a system and method for determining the mobility of a node in a network is described in U.S. Pat. No. 7,181,214 entitled "A System and Method for Determining the Measure of Mobility of a Subscriber Device in an Ad-Hoc Wireless Network with Fixed Wireless Routers and Wide Area Network (WAN) Access Point", granted Feb. 20, 2007, the entire contents being incorporated herein by reference.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
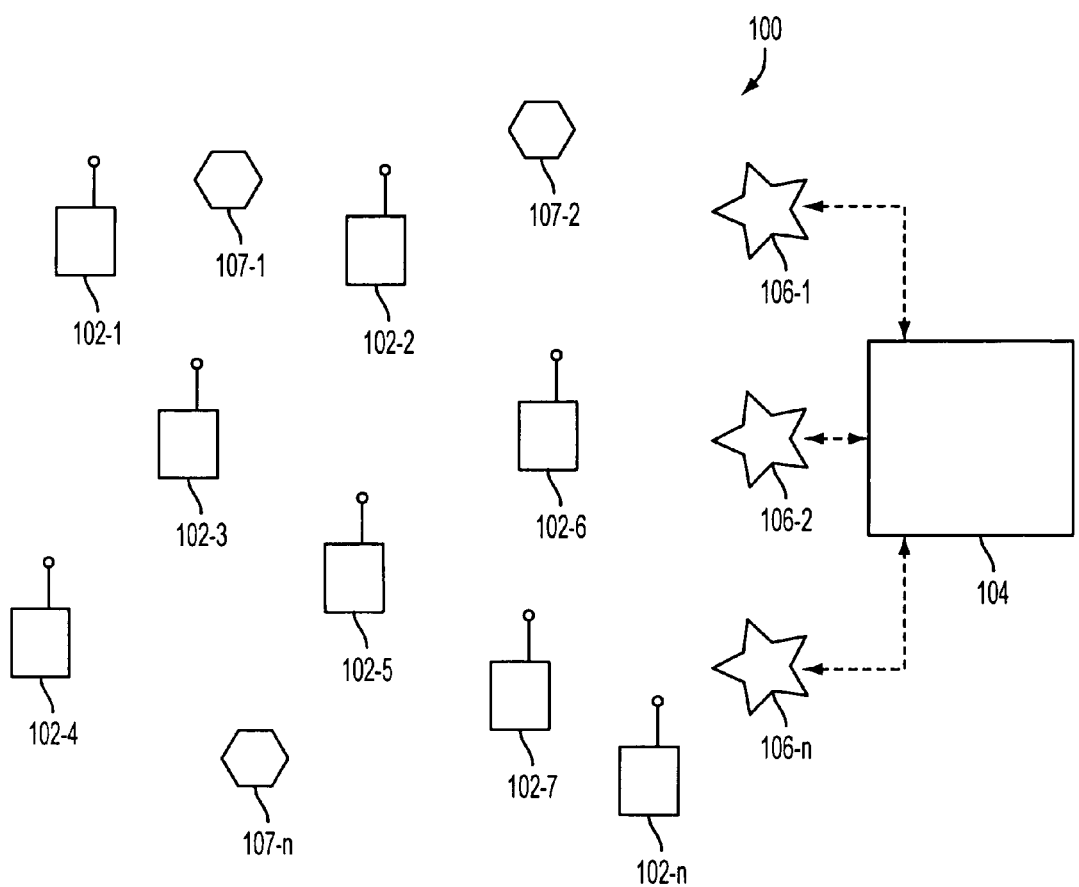
FIG. 1 is a block diagram of an example of a multihopping wireless communication network including a plurality of nodes employing a system and method in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for managing communication links in a wireless communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for managing communication links in a wireless communication network as described herein. The non-processor circuits may include, but are not limited to, a radio receiver, a radio transmitter, signal drivers, clock circuits, power source circuits, and user input devices. As such, these functions may be interpreted as steps of a method for managing communication links in a wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As discussed in more detail below, the present invention provides a system and method for managing communication links in a wireless communication network. The system and method perform the operations of estimating an expected rate of change in the characteristics of a communication link in the network, and assigning a value associated with the link based on the expected rate of change. The system and method also adjust the rate of change of the value associated with the link based on the condition of the link.

FIG. 1 is a block diagram illustrating an example of an ad-hoc packet-switched multihopping wireless communications network 100 employing an embodiment of the present invention. Specifically, the network 100 includes a plurality of mobile wireless user terminals 102-1 through 102-n (referred to generally as nodes 102, subscriber devices (SDs) 102 or mobile nodes 102), and can, but is not required to, include a fixed network 104 having a plurality of access points 106-1, 106-2, . . . 106-n (referred to generally as nodes 106, access points (APs) 106 or intelligent access points (IAPs) 106), for providing nodes 102 with access to the fixed network 104. The fixed network 104 can include, for example, a core local access network (LAN) or wide area network (WAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107, fixed routers 107 or wireless routers (WRs) 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in United States Patent Application Publication Number US-2002-0058502-A1, and U.S. Pat. Nos. 6,807,165 and 6,873,839, referenced above.

Figure 2:
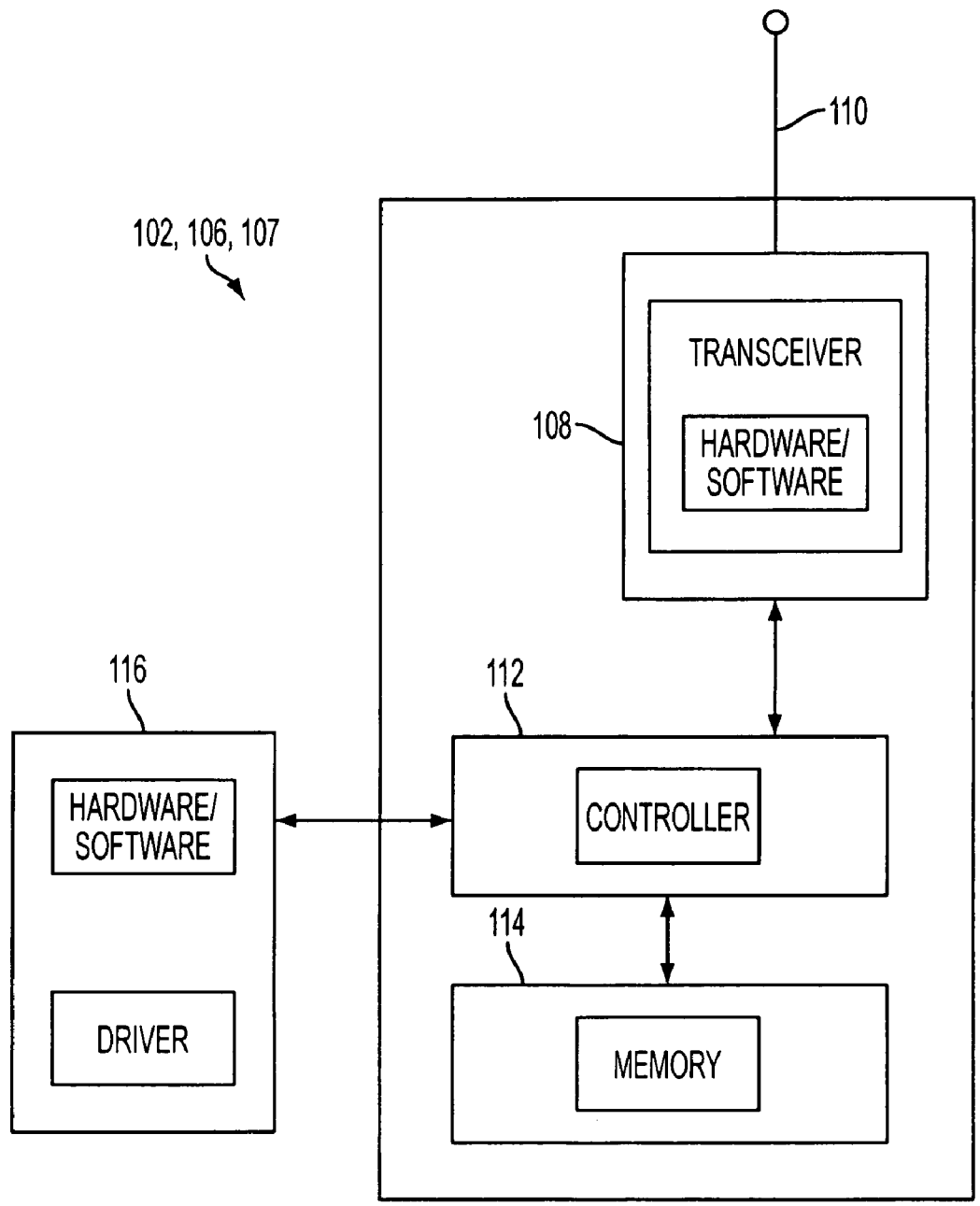
FIG. 2 is a block diagram illustrating an example of a mobile node employed in the network shown in FIG. 1.

As shown in FIG. 2, each node 102, 106 and 107 includes at least one transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 3:
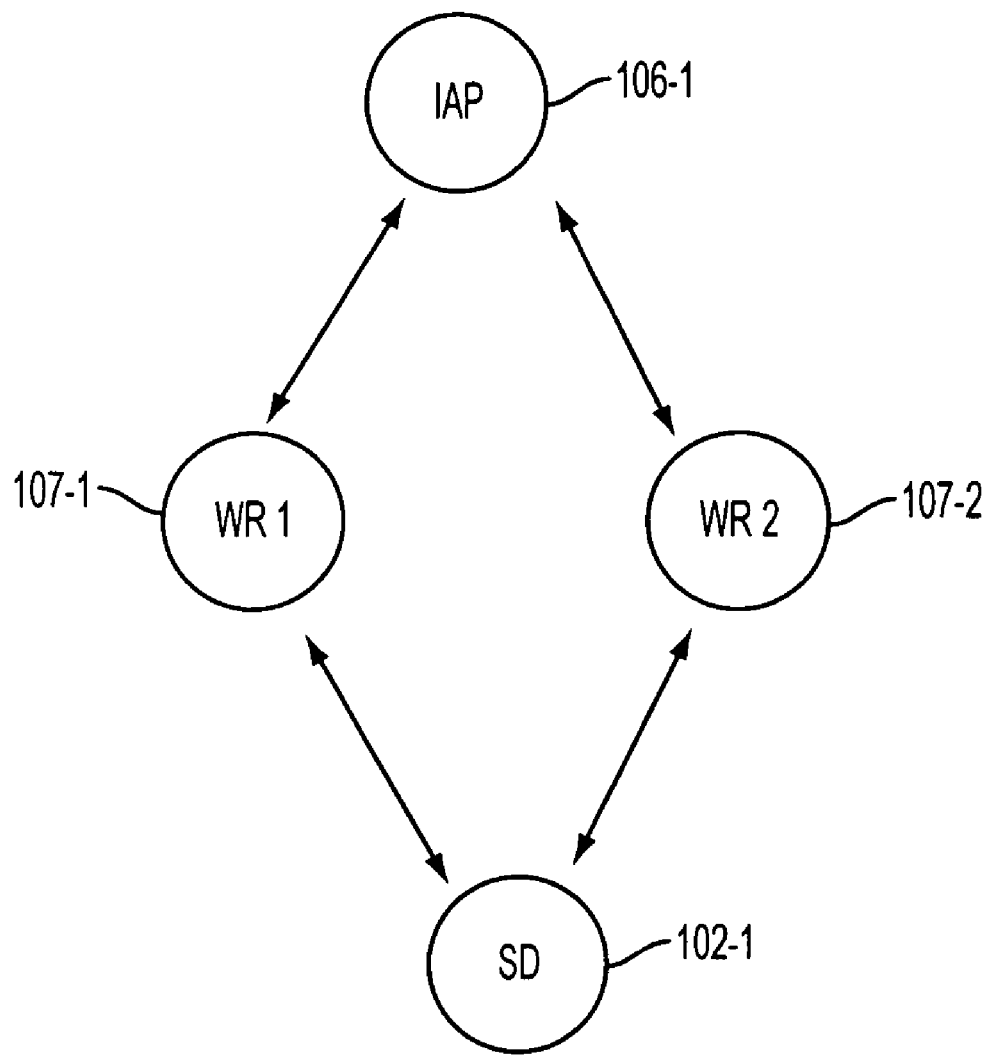
FIG. 3 is a block diagram illustrating an example of communication links between several nodes in the wireless communication network as shown in FIG. 1.

As can be appreciated by one skilled in the art, changes in links between the nodes 102, 106 or 107 often occur due to, for example, movement of the mobile nodes 102. FIG. 3 illustrates an example of links between an SD 102-1, wireless routers 107-1 and 107-2, and an IAP 106-1 in the network 100. The quality of the links between the SD 102-1 and the wireless routers 107-1 and 107-2 can change when the SD 102-1 moves. As discussed in more detail below, an embodiment of the present invention estimates the quality of the links between the nodes, so that appropriate packet routing can occur between the nodes. The estimation can be based on signal strength, signal-to-noise ratio, or any other statistic collected at the physical layer that is deemed representative of the quality of a link.

As can further be appreciated by one skilled in the art, the nodes 102, 106 and 107 use a routing protocol that assigns a link metric to each link in the network 100 in order to select the best route between nodes. Also, when a mobile node 102, for example, uses an association protocol to associate with an access point 106, the mobile station 102 uses the routing metrics to determine the link quality to the available access points 106 in order to select the access point 106 that will provide the best packet routing. A node 102, 106 or 107 can also use the metrics in a link adaptation protocol to determine, for example, the optimal transmit power at which to transmit a packet addressed to a certain destination.

The dynamic nature of the wireless medium results in the nodes 102, 106 and 107 of the network 100 performing averaging calculations on the statistics pertaining to the quality of the links between nodes 102, 106 and 107 in order to determine the appropriate routes between the nodes 102, 106 and 107. For example, the successful reception by a node 102, 106 or 107 of one packet does not necessarily indicate that the link over which the packet was transmitted is reliable. Similarly, the successful reception by a node 102, 106 or 107 of one packet at a particular transmit power does not necessarily indicate that the transmit power is optimal. Also, the reception by a node 102, 106 or 107 of one packet at a particular signal strength and signal-to-noise ratio does not guarantee that all packets will be received at the same signal strength and signal-to-noise ratio over a particular link. Hence, an embodiment of the present invention assesses statistics pertaining to the links over a period of time, in order to more accurately estimate the quality of the links.

As can be appreciated by one skilled in the art, an efficient manner of performing averaging or "smoothing" of statistics over time is to use a moving average filter, or more preferably, an exponentially-weighted moving average filter. Moving average filters and exponentially-weighted moving average filters are functionally similar. For illustrative purposes, an exponentially-weighted moving average filter is employed in the example discussed below. Also, although the following example demonstrates the use of a filtering process for link quality estimation, the filtering process can be used to filter any characteristic or parameter in a wireless communication network 100 that is dependent on or affected by the varying nature of the wireless communication medium, such as data rate, packet transmit power, packet fragmentation threshold, frequency channel, code channel, time-of-arrival, angle-of-arrival and/or antenna configuration.

For purposes of this example, the operations will be discussed with regard to a node 102. However, these operations can be performed by any of the nodes 102, 106 and 107. Also in this example, the node 102 performs the link quality estimation operation for each neighboring node 102, 106 and/or 107. That is, the link between each neighbor node 102, 106 and/or 107 is associated with one link quality value, and this value is updated when a data packet is sent to and acknowledged (or not acknowledged) by that neighbor (i.e., an active measurement). The link quality value also can be updated when a beacon (information packet) is received from that neighbor node 102, 106 or 107 (i.e., a passive measurement) as can be appreciated by one skilled in the art. However, in this example, the node 102 takes no action in updating the link quality value of a link when a data packet is received from a neighbor node 102, 106 or 107 over that link.

The exponentially-weighted moving average filter in this example uses a forgetting factor λ which can have a value ranging from zero (0) to one (1), as shown in the following equation:

$$LQ(t_i) = \lambda(V, \Delta t) \cdot X(t_i) + (1 - \lambda(V, \Delta t)) \cdot LQ(t_{i-1})$$

$LQ(t_i)$ is the current link quality
$LQ(t_{i-1})$ is the previous link quality
$X(t_i)$ is the current prediction
$\lambda(V, \Delta t)$ is the forgetting factor, based on:
  V the relative velocity
  $\Delta t$ the traffic rate As can be appreciated from the above equation, different convergence rates for the link quality estimation can be obtained by applying different values forgetting factor λ for each type of link, that is, a link that is dynamic in nature (due to the relative velocity between two nodes) or a link that is static in nature. As discussed in more detail below with regard to the graphs 400 and 500 shown in FIGS. 4 and 5, respectively, the forgetting factor λ is assigned values so that the link quality estimation converges faster for dynamic links (i.e., links between two mobiles nodes 102 or links between a mobile node 102 and a stationary node 106 or 107) than for static links (i.e. links between two stationary nodes 106 and/or 107). The value of the forgetting factor λ for a dynamic link between nodes 102, 106 and/or 107 can further be based on the mobility of the nodes 102, 106 and/or 107. That is, the value of the forgetting factor λ used for a link between highly mobile nodes (e.g. two fast moving nodes 102 or a fast moving node 102 and a stationary node 106 and/or 107) is generally greater than the value of the forgetting factor λ used for a link between less mobile nodes (e.g. two slow moving nodes 102 or a slow moving node 102 and a stationary node 106 and/or 107). A degree of mobility can be used to vary the convergence rate in a progressive manner. For example, instead of having two discrete conditions (e.g., one for "static" and one for "mobile"), there could be varying degrees of mobility, such as "static", "slow", "fast" and "very fast", or a continuous variation based on the relative velocity V. This allows for highly mobile links to adapt their link quality values quicker in a fast-varying environment. At the same time, the static links preferably maintain a slower convergence rate as discussed below.

As mentioned above, to determine whether a link is dynamic or static, it is necessary to know whether the nodes 102, 106 and 107 are mobile or stationary, as described in the Table 1 below.

TABLE 1

| Transmitter Type | Receiver Type | Nature of the Link |
| --- | --- | --- |
| Mobile Node | Mobile Node | Dynamic |
| Mobile Node | Stationary Node | Dynamic |
| Stationary Node | Mobile Node | Dynamic |
| Stationary Node | Stationary Node | Static |

This determination ensures that the calculations performed by a stationary node (e.g., nodes 106 or 107) to assess the link quality to a mobile node 102 converge as fast as the calculations performed by a mobile node 102 to assess the link quality to a stationary node 106 or 107. The mobility of a node (e.g., node 102) can be determined in any suitable manner, such as by the techniques described in U.S. Pat. No. 7,181, 214 referenced in the Background section above.

As can further be appreciated by one skilled in the art, the link quality estimation equation set forth above can be based in part on the packet completion rate by setting $X(t_0)$ equal to one (1) for a successful packet transmission and $X(t_0)$ equal to zero (0) for a packet failure. The link quality estimation can also be based on information pertaining to, for example, the characteristics of the channels used by the link as described, for example, in published United States Patent Application Number 2003/0134658 to Kaminski, Stephen; et al. entitled "Method for communicating messages within a wireless communication network involving measurement of channel characteristics and communication network implementing said method," which is incorporated herein by reference, or by any other suitable information pertaining to the link.

Figure 4:
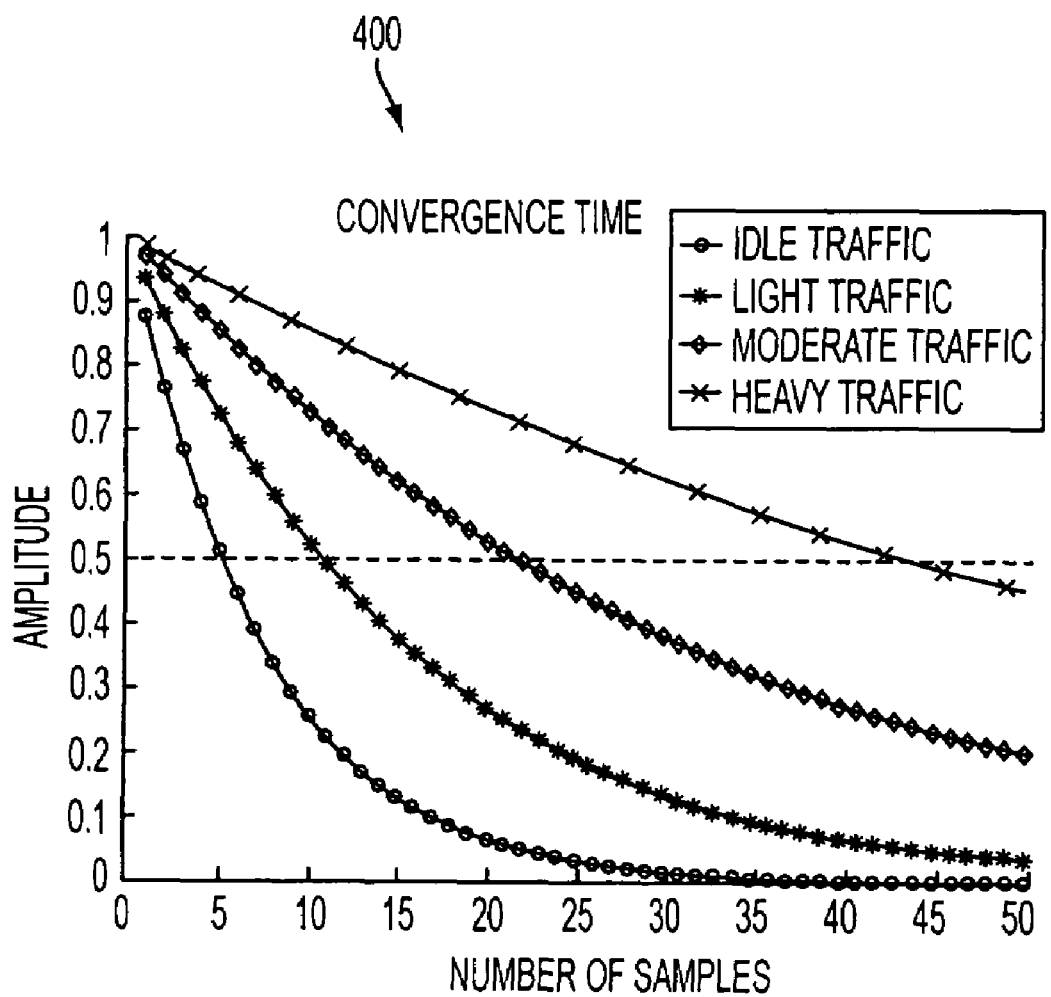
FIG. 4 is a graph depicting an example of variable-weight filter properties for dynamic communication links between nodes operating in the communication network shown in FIG. 1.
Figure 5:
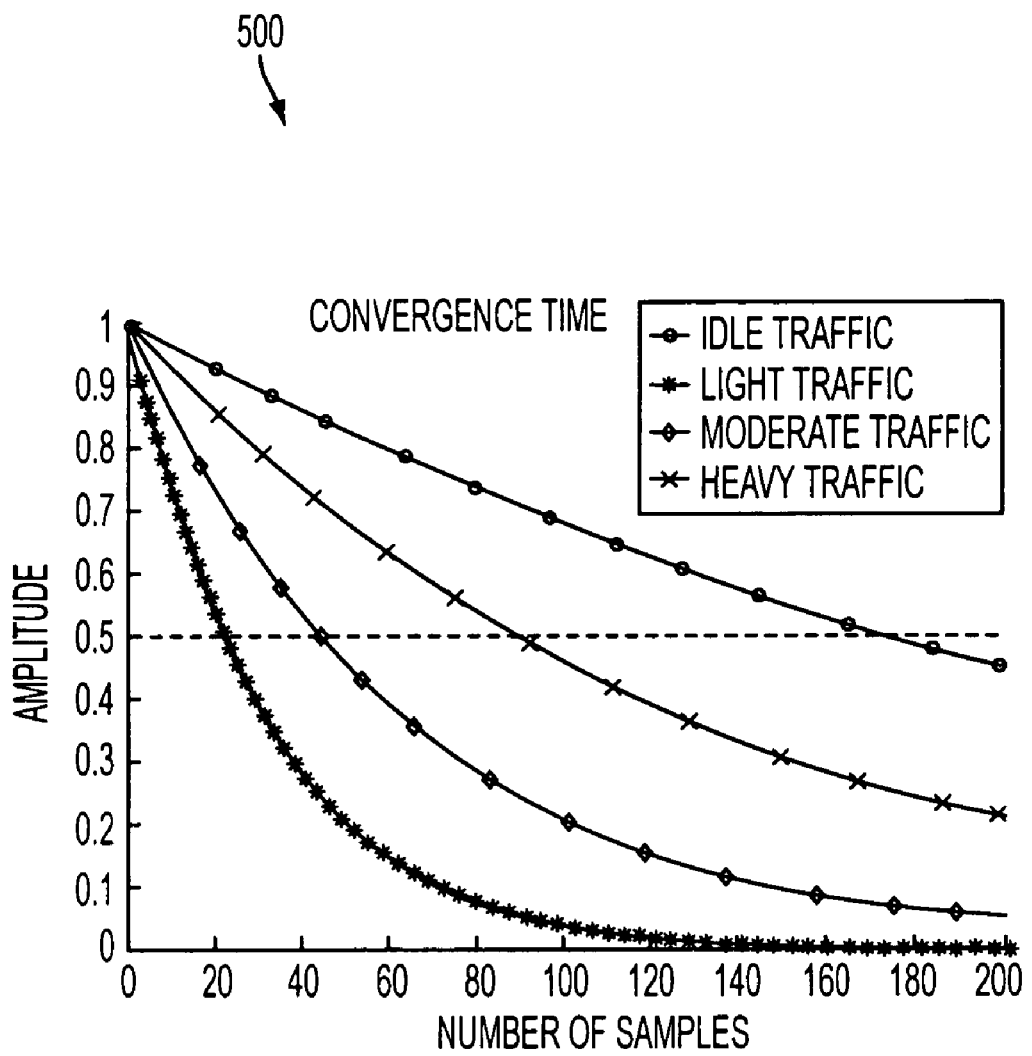
FIG. 5 is a graph depicting an example of variable-weight filter properties for static communication links between nodes operating in the communication network shown in FIG. 1.

As discussed in more detail below an as illustrated in the examples of FIGS. 4 and 5, link quality can also be estimated based on the receive statistics of a periodic beacon received by the node 102 (i.e., a passive measurement). That is, the prediction can be based on signal strength, signal-to-noise ratio or any statistic collected at the physical layer that is deemed representative of the quality of a link. The convergence rate of the link quality estimation based on received beacons also is slower for static links than for dynamic links, especially since received statistics pertaining to a link tend to be less accurate than transmission statistics, which are based on the actual successful transmission of data packets. In accordance with an embodiment of the present invention, the value of the forgetting factor λ that is used in the above equation for a static link is generally set to be smaller for information that is received in a beacon than for information that is collected based on transmission statistics when the link is a static link. However, when the link is a dynamic link, the slow-recurring beacons are used to update the link quality estimation faster than transmitted data packets and therefore, the value of the forgetting factor λ is set to be larger for beacons than for data packets. As such, the role of a link quality predictor is different between nodes that are fixed (e.g. to an immovable structure such as a light pole, a tower or a building) than between nodes that are mobile.

The following example shows how both receive and transmit statistics can be used to estimate the link quality according to the above equation for dynamic and static links. It is noted that the operations shown in FIG. 6 can be performed by the controller 112 of a node (node 102 in this example) and its associated hardware and software.

Figure 6:
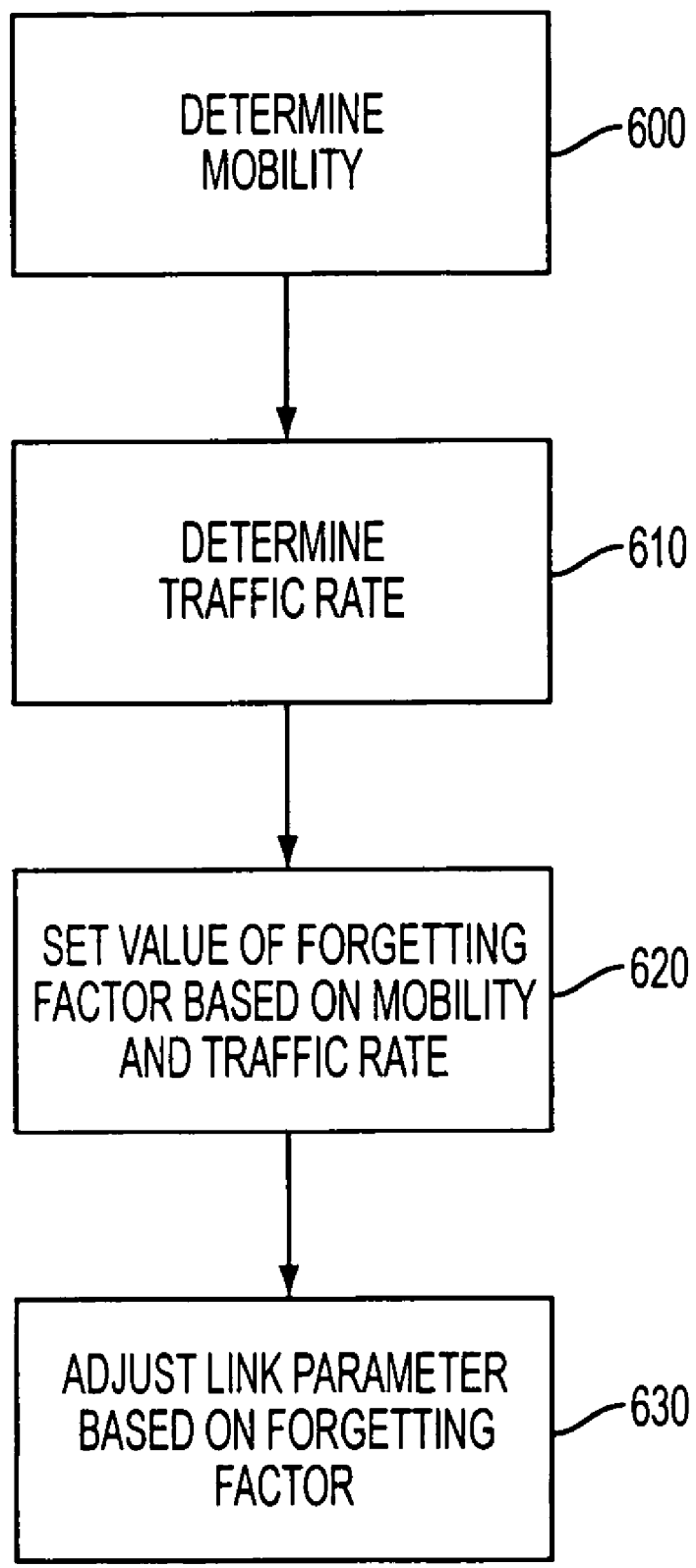
FIG. 6 is a flowchart illustrating an example of operations performed by a node for estimating a change in a communication link according to an embodiment of the present invention.

As shown in the flowchart of FIG. 6, when a node (e.g., node 102) estimates the quality of a link, the node 102 determines the mobility of the link in step 600 to determine whether the link is a dynamic link or a static link. The mobility can be determined in any suitable manner as discussed above. Also, information pertaining to the mobility of a node 102, 106 or 107 can be hard-coded in its memory 114 depending on the nature or function of the node 102, 106 or 107. For example, a node such as an IAP 106 or WR 107 that is designed to be attached to a pole or mounted on a building is deemed to be "stationary", while a node (e.g., node 102) that is designed to be mounted on a vehicle or held by an end-user is deemed to be "mobile". Also, the mobility of a node 102, 106 or 107 can be determined by analyzing certain variations in the wireless communication medium. For example, a node 102, 106 or 107 can analyze its distance to its neighbor nodes 102, 106 or 107 to determine whether it is stationary or not, according to the rate of change of the distance.

A node 102, 106 and 107 will also share information pertaining to its mobility with its neighbor nodes 102, 106 or 107 by, for example, broadcasting this information at regular intervals. Depending on whether the node's mobility is hard-coded or dynamically determined, the nature of the link may be constant or vary according to environmental conditions. The broadcast information about the node's mobility can be conveniently and efficiently combined with other broadcast information. In its simplest implementation, the broadcast information can occupy as little as one bit of information.

Once the node 102 determines the mobility of the link in step 600, the node 102 will determine the data rate at which the node 102 will transmit a packet (if any) over the link in step 610. The node 102 then sets the value for the forgetting factor in step 620 based on the mobility and data rate as will now be described. It is noted that in the following examples, the link is determined to be either dynamic (e.g., node 102 is moving) or static (e.g., node 102 is not moving). Due to the likelihood that nodes such as IAPs 106 or WRs 107 that communicate with the fixed network 104 or backbone are stationary, it is possible to slow down the link quality recovery process for static links involving those nodes by converging the link quality estimation slower than would be necessary if the node was mobile and needed to update its link quality information at a faster rate.

Dynamic Links:

The forgetting factor for a dynamic link can be determined based on the following four operating conditions as shown in the graph 400 of FIG. 4.

Idle Traffic: In this case, the node 102 is not transmitting a packet over the link, but rather, is only receiving beacons over the link. In this case, the node 102 sets the value for $X(t_0)$ to zero (0). This operating condition corresponds, for example, to an average packet inter-arrival time greater than 500 millisecond (ms). For this type of condition, the node 102 sets the forgetting factor λ equal to 0.125 in this example. For exemplary purposes, the link quality threshold can be set at 50%, or any other suitable value, meaning that when the link quality value drops to the threshold value, the node 102 determines that the link is unsuitable for communication. According to equation set forth above, it takes five (5) received beacons for the node 102 to adjust the link quality estimation from 100% (ideal link quality) down to 50% as shown in FIG. 4.

Light traffic: In this case, the node 102 determines that the rate at which it will transmit the packet over the link being analyzed is low. This operating condition corresponds, for example, to an average packet inter-arrival time between 200 ms and 500 ms. For this type of condition, the node 102 sets the forgetting factor λ equal to 0.0625 in this example. According to the equation set forth above, it takes eleven (11) transmission failures, that is, eleven (11) times that the value for $X(t_0)$ is set to zero (0), to adjust the link quality estimation from 100% to approximately 50% as shown in FIG. 4.

Medium traffic: In this case, the node 102 determines that the rate at which it will transmit the packet over the link being analyzed is moderate. This operating condition corresponds, for example, to an average packet inter-arrival time between 100 ms and 200 ms. For this type of condition, the node 102 sets the forgetting factor λ equal to 0.03125 in this example. According to the equation set forth above, it takes twenty-two (22) transmission failures, that is, twenty-two (22) times that the value for $X(t_0)$ is set to zero (0), to adjust the link quality estimation from 100% to approximately 50% as shown in FIG. 4.

Heavy traffic: In this case, the node 102 determines that the rate at which it will transmit the packet over the link being analyzed is high. This operating condition corresponds, for example, to an average packet inter-arrival time smaller than 100 ms. For this type of condition, the node 102 sets the forgetting factor λ equal to 0.015625 in this example. According to the equation set forth above, it takes forty-five (45) transmission failures, that is, forty-five (45) times that the value for $X(t_0)$ is set to zero (0), to adjust the link quality estimation from 100% to approximately 50% as shown in FIG. 4.

Static Links:

The forgetting factor for a static link can be determined based on the following operating conditions as shown in the graph 500 of FIG. 5.

Light traffic: In this case, the node 102 determines that the rate at which it will transmit the packet over the link being analyzed is low. This operating condition corresponds, for example, to an average packet inter-arrival time greater than 200 ms. For this type of condition, the node 102 sets the forgetting factor λ equal to 0.03125 in this example. According to the equation set forth above, it takes twenty-two (22) transmission failures, that is, twenty-two (22) times that the value for $X(t_0)$ is set to zero (0), to adjust the link quality estimation from 100% to approximately 50% as shown in FIG. 4.

Medium traffic: In this case, the node 102 determines that the rate at which it will transmit the packet over the link being analyzed is moderate. This operating condition corresponds, for example, to an average packet inter-arrival time between 100 ms and 200 ms. For this type of condition, the node 102 sets the forgetting factor λ equal to 0.015625 in this example. According to the equation set forth above, it takes forty-five (45) transmission failures, that is, forty-five (45) times that the value for $X(t_0)$ is set to zero (0), to adjust the link quality estimation from 100% to approximately 50% as shown in FIG. 4.

Heavy traffic: In this case, the node 102 determines that the rate at which it will transmit the packet over the link being analyzed is high. This operating condition corresponds, for example, to an average packet inter-arrival time smaller than 100 ms. For this type of condition, the node 102 sets the forgetting factor λ equal to 0.0078125 in this example. According to the equation set forth above, it takes eighty-nine (89) transmission failures, that is, eight-nine (89) times that the value for $X(t_0)$ is set to zero (0), to adjust the link quality estimation from 100% to approximately 50% as shown in FIG. 4.

Idle Traffic: It is noted that for a static link, a special forgetting factor λ is used when the node 102 receives beacons to ensure that poor links between stationary nodes (e.g., nodes 102 that are not moving, and nodes 106 and 107) do not recover fast. That is, the actual statistics of the link do not change over time and the weight of the prediction should be considerably smaller than the weight of the measure. In this example, the node sets the forgetting factor equal to 0.00390625 and therefore, it takes one-hundred and seventy-eight (178) beacons to adjust the link quality estimation from 100% down to 50%. Also, when beacons are received in the midst of traffic being sent, their weight is so low compared to the transmit estimation that they have a negligible impact on the final result.

As can be appreciated from the above, the different operating conditions allow for the link quality estimation to converge in the same or substantially the same amount of time, regardless of the amount of traffic or data rate, as described, for example, in U.S. Pat. No. 7,412,241 entitled "Method to Provide a Measure of Link Reliability to a Routing Protocol in an Ad Hoc Wireless Network", issued on Aug. 12, 2008, the entire contents being incorporated herein by reference. That is, the link quality estimation will converge to the threshold value (e.g., 50%) in about the same time, regardless of the level of traffic or data rate.

Once the node 102 has determined the value of the forgetting factor λ as discussed above, the node 102 can adjust the link quality value in step 630 based on the above equation that includes the forgetting factor. As stated above, a node 102 can perform the link quality evaluation process and adjustment for each packet to be transmitted.

In addition, it is noted that the above techniques employing a forgetting factor need not be used only for adjusting a link quality value. Rather, this technique can be used to adjust other parameters, such as signal to noise ratios, transmit power levels, data rates, time-of-arrivals, angle-of-arrivals and so on.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for managing communication links by determining a characteristic of communication over at least one communication link between a first node and at least one other node in a wireless communication network, comprising:

determining a mobility value pertaining to the communication link;

determining a factor based on the mobility value including assigning a higher factor value to the factor for a lower mobility value determined by the active measurement and a lower factor value to the factor for a lower mobility value determined by passive measurement; and adjusting a value pertaining to the characteristic of communication over the communication link at an adjustment rate that is based on the determined factor including adjusting the value pertaining to the characteristic at a faster rate for the active measurement and at a slower rate for the passive measurement.

2. A method as claimed in claim 1, wherein:

the characteristic is at least one of the quality of the communication link, data rate at which a packet is transmitted over the communication link, transmit power at which a packet is transmitted over the communication link, packet size of a packet transmitted over the communication link, time-of-arrival of a packet at the other node, and angle-of-arrival of a packet at the other node.

3. A method as claimed in claim 1, wherein:

the mobility value determining step determines the mobility value based on movement of at least one of the first node and one of the other nodes.

4. A method as claimed in claim 1, further comprising:

performing the mobility value determining, factor determining and adjusting steps for each of the communication links between the first node and the other nodes.

5. A method as claimed in claim 1, wherein:

the wireless communication network is a multihopping wireless communication network, and the first node and each of the other nodes is one of a mobile node and a stationary node adapted to communicate in the multi-hopping wireless communication network.

6. A method for managing communication links by determining a characteristic of communication over at least one communication link between a first node and at least one other node in a wireless communication network, comprising:

determining a mobility value pertaining to the communication link;

determining a factor based on the mobility value;

adjusting a value pertaining to the characteristic of communication over the communication link at an adjustment rate that is based on the determined factor;

determining whether one of the nodes is about to transmit a packet over the communication link;

when the node is not about to transmit a packet, determining whether that one of the nodes has received an information packet over the communication link;

when that node is about to transmit the packet, the factor determining step comprises determining the factor based on the mobility value and a transmission rate at which the packet is to be transmitted; and when that node has received the information packet, the factor determining step comprises determining the factor based on the mobility value and information contained in the information packet.

7. A method as claimed in claim 6, wherein:

the factor determining step assigns a higher factor value to the factor for a higher transmission rate and a lower factor value to the factor for a lower transmission rate, so that the adjusting step adjusts the value pertaining to the characteristic at a faster rate for the higher transmission rate and a slower rate for the lower transmission rate.

8. A method as claimed in claim 7, wherein:

the factor determining step sets the factor such that the adjusting step adjusts the value pertaining to the characteristic by substantially the same amount within substantially the same amount of time for the higher transmission rate and the lower transmission rate.

9. A method as claimed in claim 6, wherein:

the information packet is included in a beacon.

10. A node, operating within a wireless communication network, the node comprising:

a transceiver, for communicating with at least one other node in the wireless communication network over at least one communication link; and a controller, operating to:

determine a mobility value pertaining to the communication link based on one of an active measurement and a passive measurement, determine a factor based on the mobility value, including assigning a higher factor value to the factor for a lower mobility value determined by the active measurement and a lower factor value to the factor for a lower mobility value determined by passive measurement, and adjust a value pertaining to a characteristic of communication over the communication link at an adjustment rate that is based on the determined factor including assigning the value to the characteristic at a faster rate for the active measurement and at a slower rate for the passive measurement.

11. A node as claimed in claim 10, wherein:

the characteristic is at least one of the quality of the communication link, data rate at which a packet is transmitted over the communication link, transmit power at which a packet is transmitted over the communication link, packet size of a packet transmitted over the communication link, time-of-arrival of a packet at the other node, and angle-of-arrival of a packet at the other node.

12. A node as claimed in claim 10, wherein:

the controller determines the mobility value based on movement of at least one of the node and one of the other nodes.

13. A node as claimed in claim 10, wherein:

the controller performs the mobility value determining, factor determining and adjusting operations for each of the communication links between the node and the other nodes.

14. A node as claimed in claim 10, wherein:

the wireless communication network is a multihopping wireless communication network, and the node and each of the other nodes is one of a mobile node and a stationary node communicates in the multihopping wireless communication network.

15. A node operating within a wireless communication network, the node comprising:

a transceiver, for communicating with at least one other node in the wireless communication network over at least one communication link; and a controller, operating to:

determine a mobility value pertaining to the communication link, determine a factor based on the mobility value, adjust a value pertaining to a characteristic of communication over the communication link at an adjustment rate that is based on the determined factor, determine whether the transceiver of the node is about to transmit a packet over the communication link; and when the transceiver of the node is not about to transmit a packet, the controller determines whether the transceiver of the node has received an information packet over the communication link;

when the transceiver of the node is about to transmit the packet, the controller determines the factor based on the mobility value and a transmission rate at which the packet is to be transmitted; and when the transceiver of the node has received the information packet, the controller determines the factor based on the mobility value and information contained in the information packet.

16. A node as claimed in claim 15, wherein:

the controller assigns a higher factor value to the factor for a higher transmission rate and a lower factor value to the factor for a lower transmission rate, so that the controller adjusts the value pertaining to the characteristic at a faster rate for a higher transmission rate and a slower rate for a lower transmission rate.

17. A node as claimed in claim 16, wherein:

the controller sets the factor such that the controller adjusts the value pertaining to the characteristic by substantially the same amount within substantially the same amount of time for the higher transmission rate and the lower transmission rate.

18. A node as claimed in claim 15, wherein:

the information packet is included in a beacon.

* * * * *